United States Patent
Stahl (10) Patent No.: US 9,986,688 B2
(45) Date of Patent: Jun. 5, 2018

(54) AIR DEFLECTOR FOR RETURN PAN OF HARVESTER CLEANING SHOE

(71) Applicant: AGCO CORPORATION, Hesston, KS (US)

(72) Inventor: Michael S. Stahl, Moundridge, KS (US)

(73) Assignee: AGCO Corporation, Duluth, GA (US)

(*) Notice: Subject to any disclaimer, the term of this patent is extended or adjusted under 35 U.S.C. 154(b) by 0 days. days.

(21) Appl. No.: 15/117,865

(22) PCT Filed: Jan. 28, 2015

(86) PCT No.: PCT/IB2015/000077
§ 371 (c)(1),
(2) Date: Aug. 10, 2016

(87) PCT Pub. No.: WO2015/121725
PCT Pub. Date: Aug. 20, 2015

(65) Prior Publication Data
US 2016/0353663 A1 Dec. 8, 2016

Related U.S. Application Data

(60) Provisional application No. 61/938,535, filed on Feb. 11, 2014.

(51) Int. Cl.
*A01F 12/44* (2006.01)
*A01F 7/06* (2006.01)

(52) U.S. Cl.
CPC ............ *A01F 12/444* (2013.01); *A01F 7/06* (2013.01); *A01F 12/44* (2013.01); *A01F 12/446* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,558,576 A | * | 9/1996 | Meyers | A01F 12/444 460/100 |
| 6,458,031 B1 | * | 10/2002 | Matousek | A01F 12/44 460/100 |

(Continued)

FOREIGN PATENT DOCUMENTS

| | | |
|---|---|---|
| EP | 0522267 A2 | 1/1993 |
| EP | 2055178 A2 | 5/2009 |
| WO | 2008/149233 A2 | 12/2008 |

OTHER PUBLICATIONS

European Patent Office, International Search Report for related PCT International Application No. PCT/IB2015/000077; dated May 15, 2015.

*Primary Examiner* — Alicia Torres (57) ABSTRACT

A crop harvester is operable to separate grain from severed crop material and broadly includes a threshing rotor, cleaning shoe, and separator pan. The separator pan is interposed between the threshing rotor and the cleaning shoe. The separator pan includes a floor and an air deflector. The floor is configured to urge separated grain on the floor forwardly while allowing a rearward air stream between the floor and rotor to carry material other than grain rearwardly. The air deflector is positioned relative to the floor to direct the rearward air stream above the floor and thereby permit forward grain movement along the pan.

22 Claims, 6 Drawing Sheets

(56) References Cited

U.S. PATENT DOCUMENTS

| | | | | |
|---|---|---|---|---|
| 6,558,252 B2* | 5/2003 | Visagie | ............... | A01F 12/444 460/100 |
| 2014/0080554 A1* | 3/2014 | Bilde | ............... | A01F 12/30 460/73 |
| 2014/0128133 A1* | 5/2014 | Claerhout | ............ | A01F 12/446 460/101 |
| 2014/0200057 A1* | 7/2014 | Farley | ............... | A01F 12/446 460/100 |

* cited by examiner

AIR DEFLECTOR FOR RETURN PAN OF HARVESTER CLEANING SHOE

BACKGROUND

1. Field

The present invention relates generally to crop harvesters. More specifically, embodiments of the present invention concern a separator pan interposed between the threshing rotor and cleaning shoe of a harvester, where the separator pan includes a floor and an air deflector to direct a rearward air stream above the floor.

2. Discussion of Prior Art

Prior art grain harvesters include a rotor assembly to thresh crop material and a cleaning shoe to separate grain from material other than grain (MOG). Some conventional harvesters include a return pan located between the rotor assembly and cleaning shoe to receive grain from the rotor assembly and to direct the grain forwardly. In particular, it is known to position a return pan along the separator section of the rotor to restrict grain from escaping through the back end of the harvester and to deposit the grain toward a forward portion of the cleaning shoe.

However, it has been found that conventional harvesters with a return pan have certain deficiencies. For instance, where a rearward air flow to separate grain from MOG impinges on the leading edge of the return pan, the air flow restricts grain from falling below the return pan. In particular, it has been found that such air flow holds grain on the return pan and above the return pan in a suspended state with MOG. The suspension of grain and MOG above the return pan by the rearward air flow also restricts the air flow from removing MOG from the harvester.

SUMMARY

The following brief summary is provided to indicate the nature of the subject matter disclosed herein. While certain aspects of the present invention are described below, the summary is not intended to limit the scope of the present invention.

Embodiments of the present invention provide a crop harvester that does not suffer from the problems and limitations of the prior art harvesters set forth above.

A first aspect of the present invention concerns a crop harvester operable to separate grain from severed crop material. The crop harvester broadly includes a threshing rotor, a cleaning shoe, and a separator pan. The threshing rotor is operable to receive and thresh the severed crop material so as to separate at least some of the grain from the severed crop material. The cleaning shoe is configured to receive threshed crop material and operable to separate additional grain therefrom. The separator pan is interposed between the threshing rotor and the cleaning shoe. The separator pan includes a floor positioned to receive at least some of the threshed crop material from the rotor, with the floor configured to urge separated grain on the floor forwardly while allowing a rearward air stream between the floor and rotor to carry material other than grain rearwardly. The separator pan includes an air deflector positioned relative to the floor to direct the rearward air stream above the floor and thereby permit forward grain movement along the pan.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figures 1, 1A:
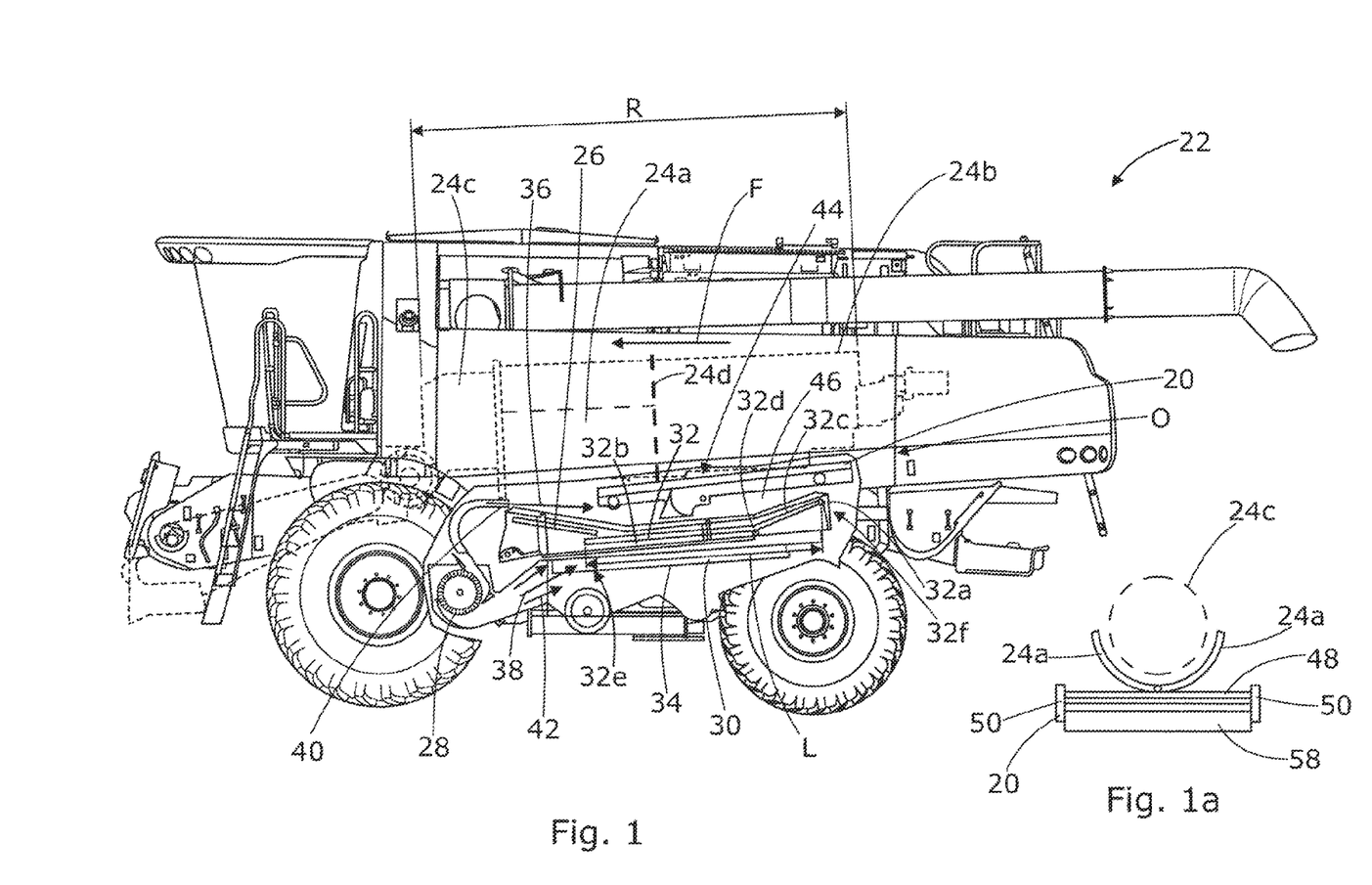
FIG. 1 is a left side elevation of a crop harvester constructed in accordance with a preferred embodiment of the present invention, with the harvester including, among other things, a threshing and separating rotor assembly, a cleaning shoe, a separator pan interposed between the rotor assembly and cleaning shoe, a precleaner, and a fan, with the cleaning shoe including a chaffer assembly and a sieve.
FIG. 1*a* is a fragmentary front cross section of the crop harvester shown in FIG. 1, showing the separator pan spanning concaves of the rotor assembly in a lateral direction.
Figure 2:
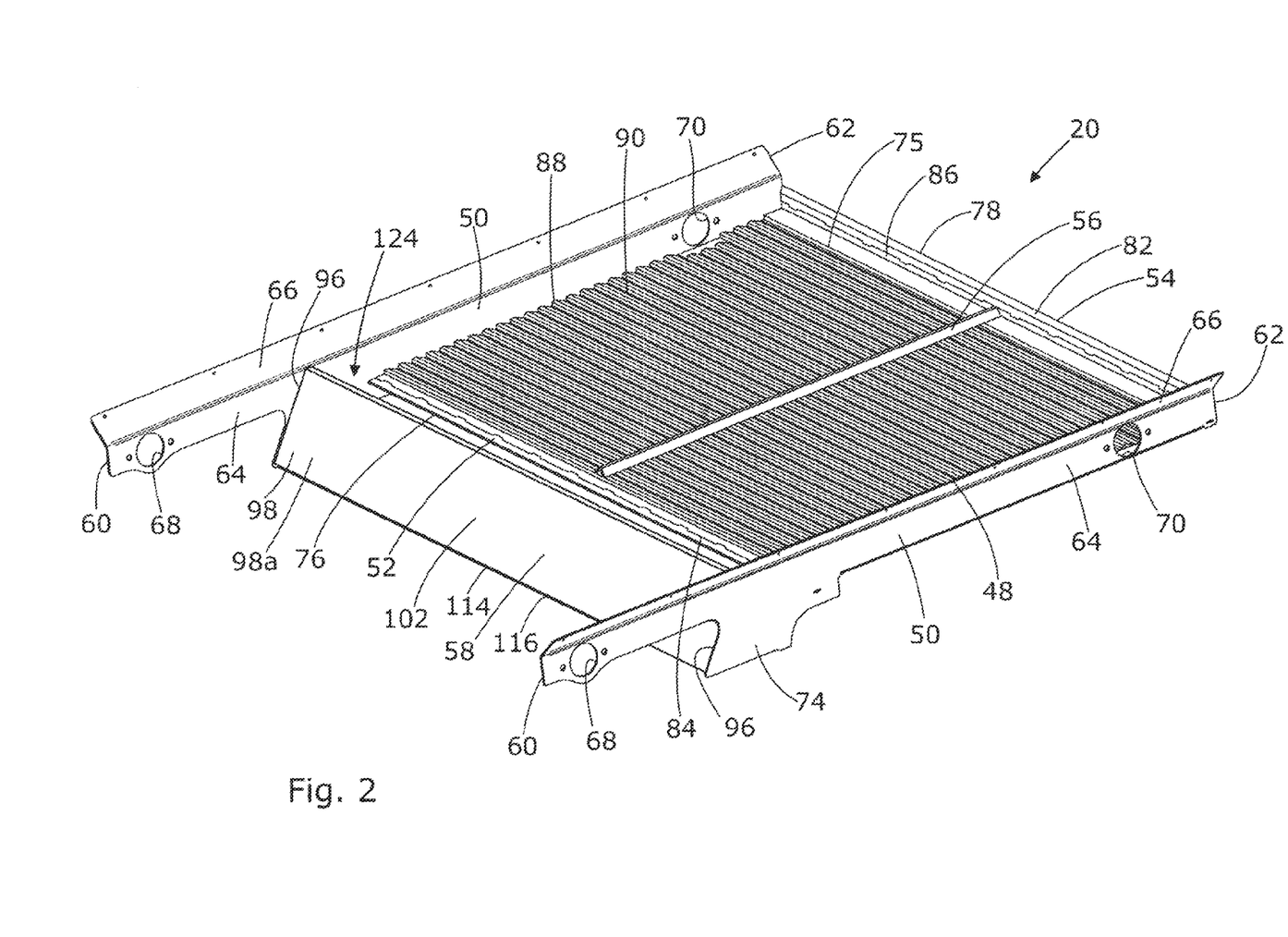
FIG. 2 is an upper front perspective of the separator pan shown in FIG. 1, showing side rails, a floor, forward and aft supports, and an air deflector.
Figure 3:
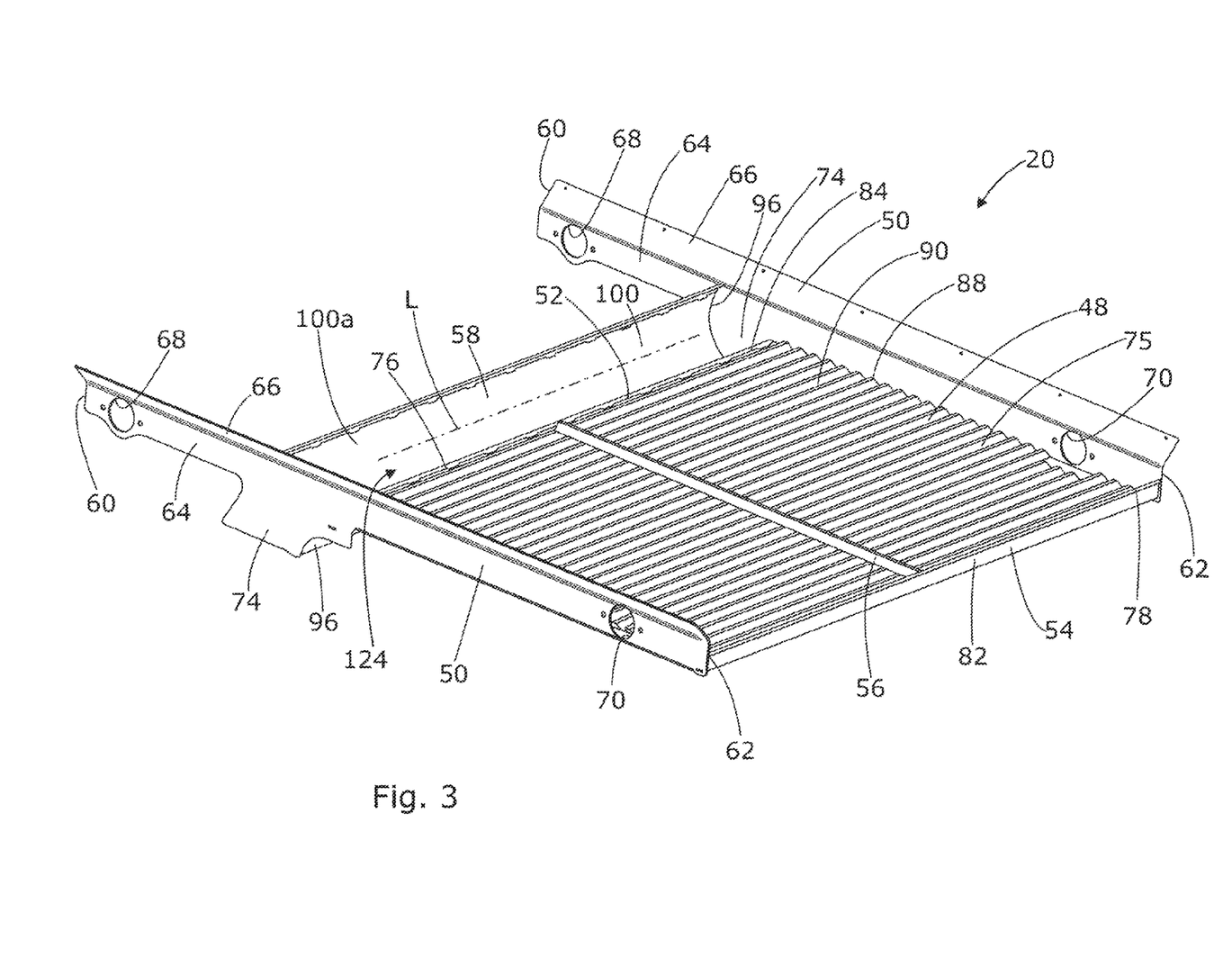
FIG. 3 is an upper rear perspective of the separator pan shown in FIGS. 1 and 2.
Figure 4:
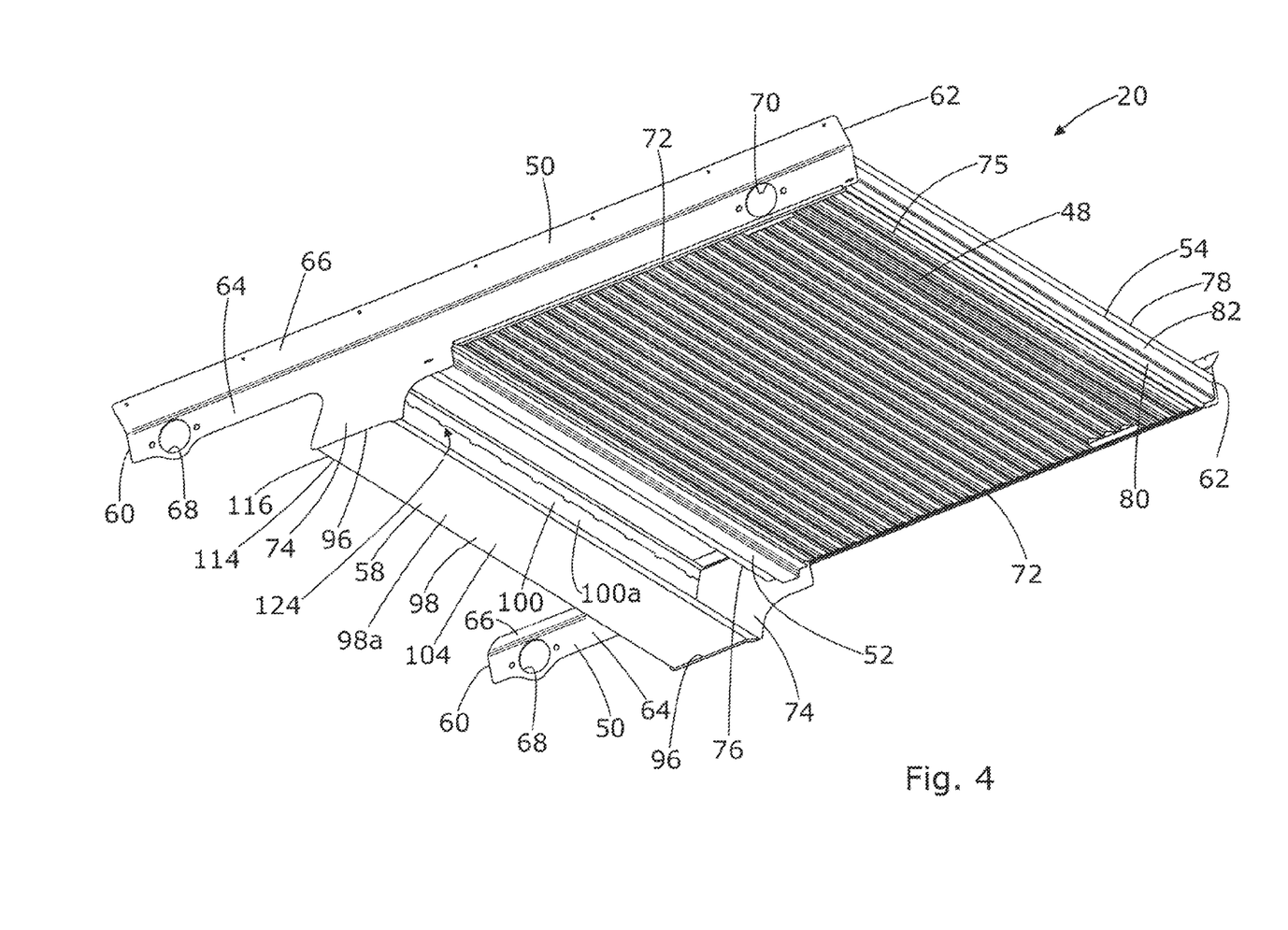
FIG. 4 is a lower rear perspective of the separator pan shown in FIGS. 1-3.

Turning initially to FIGS. 1 and 2, a separator pan 20 is constructed in accordance with a preferred embodiment of the present invention and is depicted as part of a harvester 22. The illustrated harvester 22 includes, among other things, a threshing and separating rotor assembly 24, a precleaner 26, a fan 28, and a cleaning shoe 30.

In the usual manner, the cleaning shoe 30 is configured to separate grain from material other than grain (MOG). The cleaning shoe 30 preferably includes a chaffer assembly 32 and a sieve 34. The chaffer assembly 32 includes a chaffer housing 32*a* and forward and aft chaffer sections 32*b,c*. The forward chaffer section 32*b* is fixed to the chaffer housing 32*a*. The aft chaffer section 32*c* is swingably mounted to the chaffer housing 32*a* at joint 32*d*. The joint 32*d* allows the aft chaffer section 32*c* to swing relative to the forward chaffer section 32*b* about a lateral axis for selective positioning of the aft chaffer section 32*c*. The chaffer sections 32*b,c* present respective forward and aft chaffer ends 32*e,f*. The precleaner 26 is located adjacent the forward chaffer end 32*a* and extends forwardly of the chaffer assembly 32. Additional details of the precleaner 26, chaffer assembly 32, and sieve 34 are disclosed in U.S. Provisional Application No. 61/721,814, filed Nov. 2, 2012, entitled HARVESTER HAVING CHAFFER WITH TILTABLE SECTION, which is hereby incorporated in its entirety by reference herein. However, it is also within the ambit of the present invention where the cleaning shoe 30 includes alternative structure to separate grain from MOG.

The rotor assembly 24 includes concaves 24a, a separator housing 24b, and a rotor 24c. The rotor assembly 24 also includes a rotor bulkhead 24d that supports the concaves 24a and separator housing 24b. The rotor 24c extends along the forward direction of the harvester 22 and is rotatably received by the concaves 24a and the separator housing 24b.

In the usual manner, cut crop material is fed into the rotor assembly 24, with grain and MOG being separated as material passes through the rotor assembly 24. Further separation occurs as grain and MOG pass along the precleaner 26 and through the cleaning shoe 30. Fan 28 directs upper and lower air streams 36,38 rearwardly through upper and lower openings 40,42. The upper air stream 36 from the upper opening 40 exits in a rearward direction above the cleaning shoe 30. The lower air stream 38 from the lower opening 42 exits in a rearward direction below the cleaning shoe 30. Some of the cut crop material does not pass downwardly through chaffer assembly 32, but instead passes rearwardly through a rear opening O defined between the aft end 32f of the chaffer assembly 32 and the rotor assembly 24. While the disclosed fan 28 preferably produces a pair of air streams 36,38, it is within the scope of the present invention where the fan 28 produces a single rearwardly-directed air stream (or more than two (2) air streams).

The illustrated harvester 22 defines a forward direction F along which the machine is advanced when harvesting crop. This forward direction F is generally opposed to a rearward direction along which the air streams 36,38 travel. Also, as used herein, the lateral direction is generally transverse to the forward direction F. While the air streams 36,38 of the harvester 22 are generally aligned with the forward direction F of travel of the harvester 22 (as is customary), the principles of the present invention are equally applicable to having the air streams 36,38 directed at an angle relative to the forward direction F of travel. For instance, the air streams 36,38 could travel laterally relative to the forward direction F of travel, with MOG likely being discharged in the same direction as the air streams (e.g., out the side of the machine).

Turning to FIGS. 2-6, the separator pan 20 operates to urge grain forwardly while permitting MOG on the separator pan 20 to be directed rearwardly by air from the fan 28. The illustrated separator pan 20 is interposed vertically between the rotor assembly 24 and the cleaning shoe 30. An upper passage 44 extends along the forward direction F and is defined between the rotor assembly 24 and the separator pan 20. A lower passage 46 extends along the forward direction F and is defined between the separator pan 20 and the cleaning shoe 30.

As the rotor assembly 24 threshes crop material, the threshed crop material falls downwardly toward the separator pan 20 and the chaffer assembly 32. Of the threshed crop material that falls toward the separator pan 20, some of the material contacts the separator pan 20. As will be shown, the separator pan 20 cooperates with the rearwardly directed air produced by the fan 28 to separate grain and MOG from one another while directing grain forwardly toward the cleaning shoe 30. At the same time, this arrangement directs MOG so that MOG is urged rearwardly through the rear opening O and out of the harvester.

Turning to FIGS. 2-6, the separator pan 20 preferably includes a corrugated floor pan 48, side rails 50, forward support 52, aft support 54, central rib 56, and air deflector 58. Each of the side rails 50 is preferably an elongated and unitary support beam. Because the illustrated side rails 50 are preferably mirror images of one another, features described herein refer to both side rails 50. The side rails 50 each present fore and aft ends 60,62 and include an upright lower section 64 and an angled upper section 66. The lower section 64 presents fore and aft openings 68,70 adjacent to respective fore and aft ends 60,62. The lower section 64 includes a lip 72 that is rolled in a direction away from the upper section 66 (see FIGS. 4-6). The lower section 64 also includes a lower extension 74 that projects downwardly below the corresponding lip 72. However, the principles of the present invention are applicable where the side rails 50 are alternatively configured. The side rails 50 are preferably shiftably supported adjacent to corresponding sides of the harvester 22. The angled upper sections 66 are preferably angled to direct threshed crop material toward the floor pan 48.

The illustrated side rails 50 are preferably interconnected by the forward and aft supports 52,54. The floor pan 48 and supports 52,54 cooperatively provide a floor 75. The forward support 52 preferably comprises an elongated beam that presents a continuous cross-sectional shape in the form of a channel (see FIG. 6). The forward support 52 presents a forward leading edge 76 of the floor 75. The aft support 54 preferably comprises an elongated beam that presents an L-shaped cross section and presents a rearward trailing edge 78 of the floor 75. The aft support 54 includes a lower wall 80 and an upright wall 82. However, it is within the scope of the present invention where the forward and aft supports 76,78 are alternatively configured.

The ends of the forward and aft supports 76,78 are preferably welded to corresponding side rails 50 to form a rigid structure that supports the floor pan 48 and the air deflector 58. However, it is within the ambit of the present invention where the supports 76,78 and side rails 50 are alternatively interconnected. For instance, the supports 76,78 and side rails 50 could be connected to one another with removable fasteners.

Figure 5:
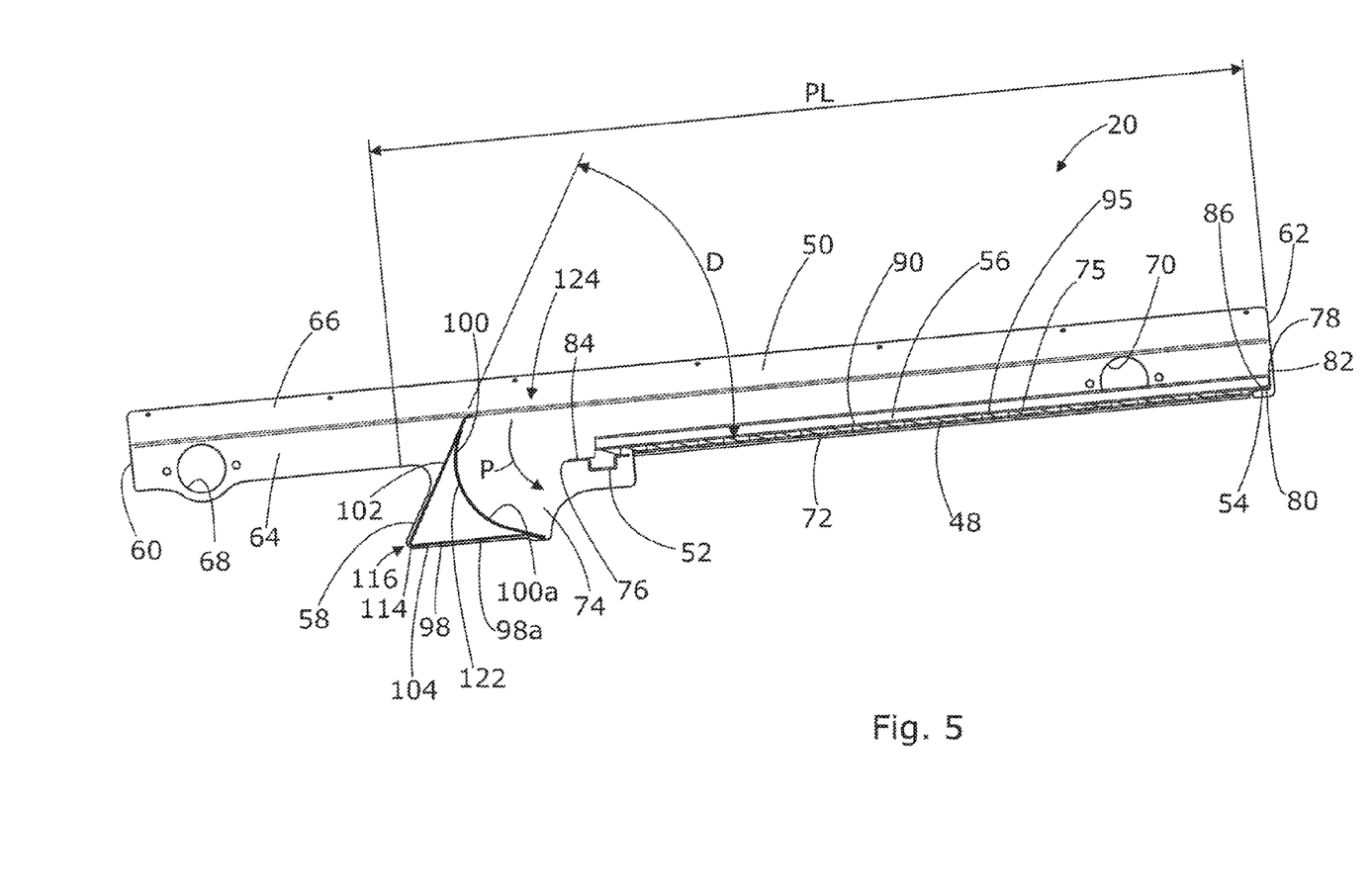
FIG. 5 is a cross section of the separator pan shown in FIGS. 1-4, showing an angled front plate and a curved rear plate of the air deflector, with the air deflector being spaced forwardly of a leading edge of the floor so that the air deflector and leading edge cooperatively define an opening.
Figure 6:
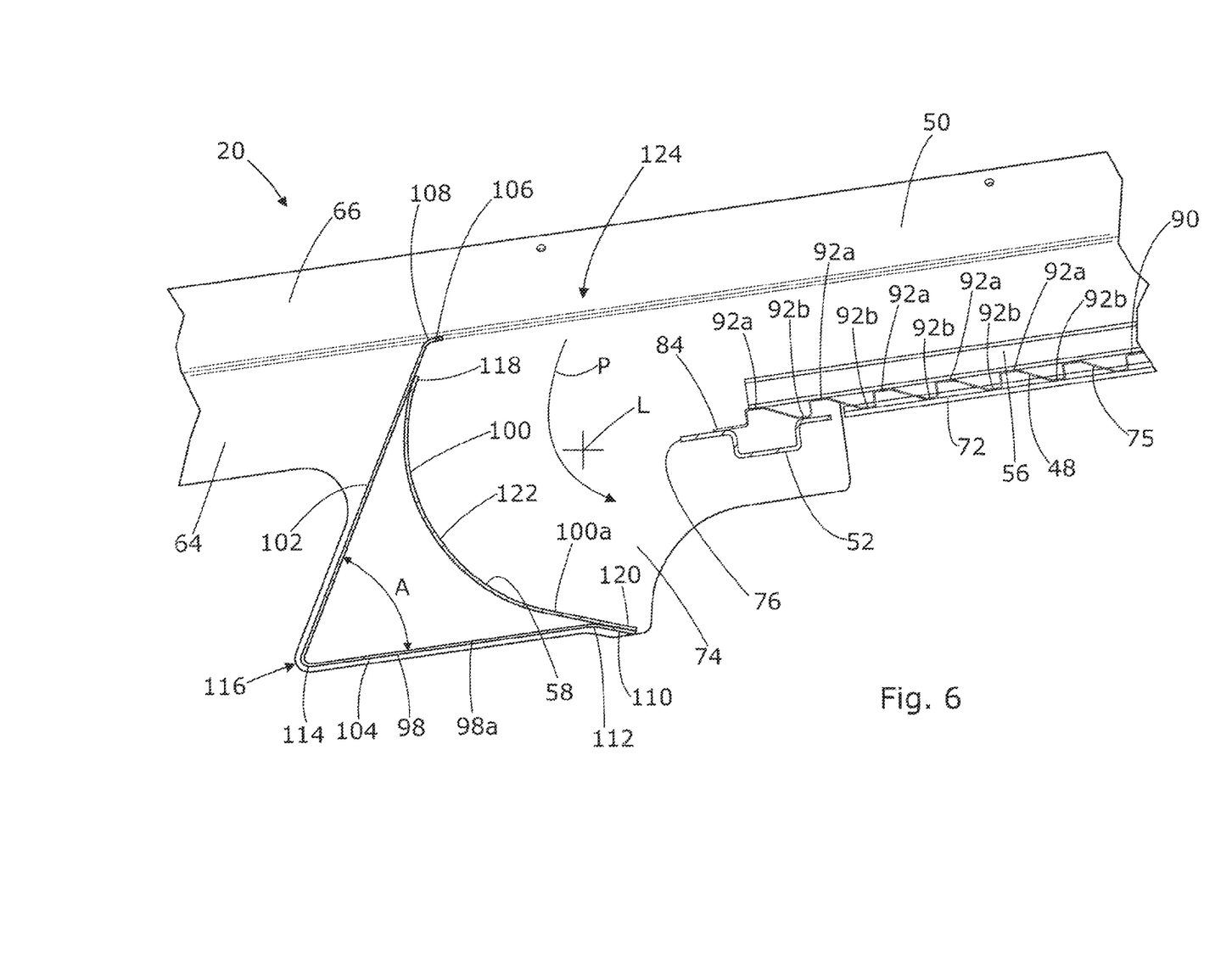
FIG. 6 is an enlarged fragmentary cross section of the separator pan shown in FIGS. 1-5.

Turning to FIGS. 2, 5, and 6, the corrugated floor pan 48 is preferably unitary and imperforate. However, it is also within the ambit of the present invention where the floor pan 48 presents a plurality of openings such that the floor pan 48 is perforated. For instance, the floor pan 48 could include openings (such as round holes or elongated slots) spaced along the width and/or length of the floor pan 48. The floor pan 48 preferably presents forward and aft margins 84,86, opposite side margins 88, and an upper corrugated surface 90 that extends continuously between the forward and aft margins 84,86. The corrugated surface 90 also preferably extends continuously between the side margins 88.

The illustrated floor pan 48 preferably includes a plurality of laterally extending ridges 92a and grooves 92b that alternate with one another along the forward direction F. The floor pan 48 includes a series of repeating ramp shapes 94 that cooperatively define the ridges 92a and grooves 92b. However, it is also within the ambit of the present invention where the ridges 92a and/or grooves 92b are alternatively shaped and/or configured to provide the floor pan 48. The ridges 92a cooperatively define an upper face 95 of the floor pan 48, with the upper face 95 preferably being planar (see FIG. 5).

The floor pan 48 is mounted on the supports 76,78 by positioning the forward margin 84 on the forward support 76 and the aft margin 86 on the aft support 78. The floor pan 48 is also preferably mounted on the side rails 50 by positioning the side margins 88 on corresponding lips 72. However, the floor pan 48 could be alternatively positioned without departing from the scope of the present invention.

In the illustrated embodiment, the margins 84,86,88 of the floor pan 48 are preferably welded to corresponding portions of the supports 76,78 and side rails 50. However, the floor pan 48 could be alternatively secured to the supports 76,78 and/or side rails 50 consistent with the scope of the present invention.

Referring again to FIGS. 5 and 6, the illustrated air deflector 58 is operable to direct the air stream 36 above the surface 90. In doing so, the air deflector 58 directs MOG rearwardly through the upper passage 44 while permitting separation of grain from MOG.

The air deflector 58 preferably extends laterally to present opposite ends 96 and includes an angled front plate 98 and a curved rear plate 100. The front and rear plates 98,100 present, respectively, a front deflector face 98a and a rear guide face 100a. The front plate 98 is unitary and preferably includes upper and lower vanes 102,104 that are integrally formed. Each of the vanes 102,104 has a generally flat, planar shape. However, one or both of the vanes 102,104 could have a curved cross-sectional shape (similar to fan blade). The vanes 102,104 extend laterally and present a cross-sectional shape that is continuous along the length of the deflector 58. The upper vane 102 includes an uppermost lip 106 that is folded relative to the remainder of the upper vane 102 along an upper bend 108 (see FIG. 6). The lower vane 104 includes a rear lip 110 that is folded relative to the remainder of the lower vane 104 along a rear bend 112 (see FIG. 6).

The illustrated upper and lower vanes 102,104 are joined along a laterally extending forward bend 114 that presents a forwardmost apex 116 of the air deflector 58 (see FIG. 6). The upper and lower vanes 102,104 cooperatively define a vane angle A that ranges from about forty degrees (40°) to about seventy degrees (70°) and, more preferably, is about sixty degrees (60°) (see FIG. 6). However, it is within the scope of the present invention where the upper and lower vanes 102,104 of the front plate 98 are alternatively configured and/or positioned relative to one another.

The rear plate 100 is also unitary and extends laterally along the front plate 98. The rear plate 100 preferably presents laterally extending upper and lower margins 118, 120 (see FIG. 6). The rear plate 100 also preferably includes a relatively large-radius bend 122 about a lateral axis L, with the bend extending downwardly from the upper margin 118. The bend 122 is shaped so that the rear guide face 100a presents a concave arcuate shape. The shape of the bend 122 is preferably continuous along the length of the deflector 58.

The illustrated rear plate 100 is positioned relative to the front plate 98 so that the upper margin 118 engages the upper vane 102 just below the uppermost lip 106. Also, the rear plate 100 is positioned so that the lower margin 120 engages the lower vane 104 along the rear lip 110. However, the rear plate 100 could be alternatively positioned relative to the front plate 98 without departing from the scope of the present invention. The rear plate 100 is preferably welded to the front plate 98 along the upper and lower margins 118,120.

However, it is within the ambit of the present invention where the plates 98,100 are alternatively attached to one another. For instance, the front and rear plates 98,100 could be attached to one another with fasteners. Yet further, the plates 98,100 could be integrally formed with one another. For instance, the plates 98,100 of the air deflector 58 could be formed as a unitary hollow extrusion. It is also within the ambit of the present invention where the air deflector 58 is provided by structure other than plates 98,100 or vane-type arrangements. For instance, the air deflector 58 could comprise a solid beam structure (i.e., a structure that is not hollow).

The front and rear plates 98,100 are each preferably formed from conventional carbon steel sheet metal, although other materials (such as a synthetic resin, aluminum, or stainless steel) could be employed. Also, while the illustrated air deflector 58 only includes the front and rear plates 98,100, the air deflector 58 could include other structural components without departing from the scope of the present invention. For instance, the air deflector 58 could include one or more additional vane structures, e.g., to suitably direct air flow relative to the floor pan 48.

The air deflector 58 is secured to the framework of the separator pan 20 by fixing the ends to corresponding side rails 50. The ends are preferably welded to the side rails 50, although other attachment methods could be used.

The air deflector 58 is spaced forwardly of the leading edge 76 of the floor pan 48 so that the air deflector 58 and the leading edge 76 cooperatively define an opening 124. The opening 124 preferably permits grain to fall over the leading edge 76 and onto the cleaning shoe 30 below the opening 124. Notably, the rear guide face 100a and the leading edge 76 cooperatively define a generally curved path P along which grain (and air) can pass downwardly through the opening 124. In particular, grain and air can move along both forward and downward directions to enter the opening 124. The rear guide face 100a redirects downwardly moving grain and air along a rearward direction to be discharged from the opening 124. This allows grain to be gently directed into the chaffer 32.

The illustrated opening 124 preferably extends continuously along the entire lateral length of the air deflector 58. However, the air deflector 58 and/or the floor 75 could be configured to provide an alternative opening 124. For instance, one or more sections of the floor 75 could extend into engagement with the rear plate 100 to define multiple openings spaced laterally along the length of the air deflector 58.

The air deflector 58 is positioned to direct air from at least one of the streams 36,38 over the surface 90. The illustrated air deflector 58 preferably extends vertically and forwardly relative to the floor pan 48. In particular, the upper vane 102 extends vertically relative to the floor pan 48, with the upper vane 102 extending vertically higher than the leading edge 76 and vertically lower than the leading edge 76. Similarly, the rear plate 100 (and corresponding guide face 100a) extend vertically higher and lower than the leading edge 76.

The upper vane 102 also extends forwardly from the uppermost lip 106 to the forwardmost apex 116. The upper vane 102 and the face 95 of the floor pan 48 cooperatively define a deflection angle D that ranges from about forty degrees (40°) to about seventy degrees (70°) and, more preferably, is about sixty degrees (60°). However, the upper vane 102 could be alternatively positioned without departing from the scope of the present invention.

The lower vane 104 preferably extends forwardly relative to the floor pan 48 from the rear lip 110 to the forwardmost apex 116. In the illustrated embodiment, the lower vane 104 is preferably substantially parallel to the floor pan 48. However, the lower vane 104 could be alternatively positioned without departing from the scope of the present invention.

Again, the air deflector 58 operates to redirect air from at least one of the streams 36,38 over the surface 90. In particular, the redirected stream of air moves along a path so that the redirected stream is spaced above the surface 90. Consequently, the redirected stream is spaced above and allows grain on the surface 90 (or immediately adjacent the surface 90) to travel forwardly along the floor pan 48.

It has also been found that the air deflector 58 causes rearwardly traveling air to tumble once the air has passed the uppermost lip 106. That is, at least some of the air passing over the lip 106 tends to swirl in a downward and forward direction into the opening 124. For grain located adjacent the leading edge 76 (whether such grain is located on the floor 75, above the floor 75, or in front of the leading edge 76), it has been found that the swirling air stream urges this grain forwardly and downwardly into the opening 124.

The separator pan 20 is preferably driven by a powered linkage (not shown) to oscillate along the forward direction F and/or vertically (e.g., similar to how components of the cleaning shoe 30 are oscillated). In particular, components of the linkage are secured to openings 68,70 and drive the separator pan 20 in an oscillating rocking motion. However, the principles of the present invention are applicable where the separator pan 20 is alternatively supported (e.g., where the separator pan 20 is fixed within the harvester).

Again, the illustrated separator pan 20 is interposed vertically between the rotor assembly 24 and the cleaning shoe 30. The separator pan 20 is preferably sized and positioned to span the concaves 24*a* and separator housing 24*b* along the lateral direction (see FIG. 1*a*). The upper passage 44 is defined between the rotor assembly 24 and the separator pan 20. In the illustrated embodiment, the harvester 22 is preferably devoid of any pans interposed between the concaves 24*a* and the separator pan 20. Also, the harvester 22 is devoid of any pans interposed between the separator housing 24*b* and the separator pan 20. The lower passage 46 is defined between the separator pan 20 and the cleaning shoe 30.

The illustrated separator pan 20 is positioned so that the floor pan 48 is located directly underneath the separating housing section 24*b* of the rotor assembly 24. In this position, the separator pan 20 is at least partly coextensive with the separating housing section 24*b* along the forward direction F. In particular, the separating housing section 24*b* projects forwardly beyond the leading edge 76 of the floor 75. Consequently, the separator pan 20 is preferably located entirely rearwardly of the concaves 24*a* of the rotor assembly 24.

In being so positioned, the separator pan 20 is located adjacent the separator housing 24*b* of the rotor assembly 24, which includes a region of the rotor that discharges threshed crop material with a relatively high percentage of MOG. The separator pan 20 does not extend along the entire length of the rotor. That is, the separator pan 20 presents a pan length dimension PL (see FIG. 5) that is preferably shorter than a rotor length dimension R (see FIG. 1) presented by the rotor assembly 24. The construction and arrangement of the illustrated separator pan 20 efficiently restricts MOG from falling into the cleaning shoe 30 while permitting grain to fall into the cleaning shoe 30. However, the principles of the present invention are applicable where the separator pan 20 is alternatively sized and/or positioned relative to the rotor assembly 24 (e.g., to improve the crop cleaning capacity of the harvester).

The separator pan 20 is also preferably positioned so that the floor pan 48 is located directly above the chaffer 32 of the cleaning shoe 30. The pan length dimension PL (see FIG. 5) of the separator pan 20 is preferably shorter than a chaffer length dimension C (extending between the fore and aft chaffer ends 32*e,f*) presented by the chaffer assembly (see FIG. 1). The separator pan 20 is at least partly coextensive with the chaffer 32 along the forward direction F, with the chaffer 32 projecting forwardly beyond the leading edge 76 of the floor pan 48. This allows threshed crop material with a relatively low percentage of MOG to be discharged from the rotor assembly 24 and fall directly into the precleaner 26 or the chaffer 32.

The rearmost margin of the air deflector 58 is longitudinally spaced between fore and aft ends 32*e,f* of the chaffer 32 so that grain falling from the opening 124 of the separator pan 20 is directed to gently fall into the chaffer 32.

Also, the aft margin 86 of the floor pan 48 is preferably spaced rearwardly of the chaffer 32. This enables the separator pan 20 to efficiently direct MOG located within the upper passage 44 out of the harvester in the rearward direction while restricting such MOG from falling into the chaffer 32.

In operation, the rotor assembly 24 threshes crop material and discharges the threshed crop material into the separator pan 20 and the cleaning shoe 30. Rearward air flow driven by the fan 28 is used to separate MOG from grain and direct the MOG rearwardly toward the opening O. At least some of the rearward air flow impinges on the air deflector 58, with a stream of air being redirected over the floor 75. The redirected air stream serves to direct MOG in the upper passage 44 in a rearward direction toward the opening O. Also, redirected stream of air moves along a path so that the redirected stream is spaced above the surface 90. As a result, the redirected stream simultaneously allows grain on the surface 90 (or immediately adjacent the surface 90) to travel forwardly along the floor pan 48.

The air deflector 58 also causes some rearwardly traveling air to tumble once the air has passed the uppermost lip 106. Thus, for grain located adjacent the leading edge 76, the tumbling air stream urges this grain forwardly and downwardly into the opening 124.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

The invention claimed is:

1. A crop harvester operable to separate grain from severed crop material, said crop harvester comprising:
   a threshing rotor operable to receive and thresh the severed crop material so as to separate at least some of the grain from the severed crop material;
   a cleaning shoe configured to receive threshed crop material and operable to separate additional grain therefrom; and
   a separator pan interposed between the threshing rotor and the cleaning shoe,
   said separator pan including a floor positioned to receive at least some of the threshed crop material from the threshing rotor, with the separator pan floor configured to urge separated grain on the separator pan floor forwardly while allowing a rearward air stream between the separator pan floor and the threshing rotor to carry material other than grain rearwardly, said separator pan including an air deflector positioned relative to the separator pan floor to direct the rearward air stream above the separator pan floor and thereby permit forward grain movement along the separator pan,
   said air deflector including a laterally extending front deflector face, said front deflector face presenting a first vane that extends vertically and forwardly relative to the separator pan floor,
   said front deflector face presenting a second vane that cooperates with the first vane to define a forwardmost apex of the front deflector face.

2. The crop harvester as claimed in claim 1, said separator pan floor presenting a forward leading edge, said air deflector being positioned forwardly of the forward leading edge of the separator pan floor.

3. The crop harvester as claimed in claim 2, said air deflector being spaced forwardly of the separator pan floor leading edge, with the air deflector and separator pan floor leading edge cooperatively defining an opening through which grain from the separator pan floor is permitted to fall.

4. The crop harvester as claimed in claim 1, said air deflector including a laterally extending vane angled relative to the separator pan floor.

5. The crop harvester as claimed in claim 1, said air deflector including a laterally extending front deflector face, said front deflector face presenting a first vane that extends vertically and forwardly relative to the separator pan floor.

6. The crop harvester as claimed in claim 5, said first vane extending vertically higher than the leading edge of the separator pan floor.

7. The crop harvester as claimed in claim 6, said first vane being at least substantially flat to extend along an angle relative to the separator pan floor.

8. The crop harvester as claimed in claim 7, said angle of the first vane relative to the separator pan floor being approximately sixty degrees.

9. The crop harvester as claimed in claim 1, said first and second vanes each being generally flat relative to the separator pan floor.

10. The crop harvester as claimed in claim 9, said second vane being parallel to the separator pan floor.

11. The crop harvester as claimed in claim 1, said forwardmost apex of the front deflector face being spaced vertically lower than the separator pan floor.

12. The crop harvester as claimed in claim 1, said air deflector including a laterally extending guide face that is spaced forwardly from the leading edge of the separator pan floor to cooperatively define an opening there between, with the laterally extending guide face being operable to guide material falling off the leading edge of the separator pan floor to a location underneath the separator pan.

13. The crop harvester as claimed in claim 12, said laterally extending guide face extending vertically higher and lower than the leading edge of the separator pan floor.

14. The crop harvester as claimed in claim 12, said laterally extending guide face being arcuate in shape.

15. The crop harvester as claimed in claim 1, said threshing rotor including a rotor element and concaves that extend along the rotor element, said crop harvester being devoid of any pans located between the concaves and the separator pan to receive the threshed crop material.

16. The crop harvester as claimed in claim 1, said separator pan floor being corrugated.

17. The crop harvester as claimed in claim 16, said separator pan floor being imperforate.

18. The crop harvester as claimed in claim 1, said air deflector defining a forwardmost apex, said separator pan floor presenting a rearward trailing edge, said separator pan presenting a pan length dimension defined from the forwardmost apex to the rearward trailing edge, said cleaning shoe including a chaffer that presents a chaffer length dimension, with the pan length dimension being shorter than the chaffer length dimension.

19. The crop harvester as claimed in claim 18, the threshing rotor presenting a rotor length dimension, with the pan length dimension being shorter than the rotor length dimension.

20. The crop harvester as claimed in claim 1, said cleaning shoe including a chaffer that presents fore and aft chaffer ends, said separator pan floor presenting a forward leading edge, with the forward leading edge being spaced between the fore and aft chaffer ends along a forward direction of the crop harvester.

21. The crop harvester as claimed in claim 1, further comprising a rotor housing including a concave and a separator housing, the separator pan floor presenting a forward leading edge, with the forward leading edge being positioned rearwardly of the concave.

22. A crop harvester operable to separate grain from severed crop material, said crop harvester comprising:
   a rotor housing including a concave and a separator housing;
   a threshing rotor operable to receive and thresh the severed crop material so as to separate at least some of the grain from the severed crop material;
   a cleaning shoe configured to receive threshed crop material and operable to separate additional grain therefrom; and
   a separator pan interposed between the threshing rotor and the cleaning shoe,
   said separator pan including a floor positioned to receive at least some of the threshed crop material from the threshing rotor, with the separator pan floor configured to urge separated grain on the separator pan floor forwardly while allowing a rearward air stream between the separator pan floor and the threshing rotor to carry material other than grain rearwardly, said separator pan including an air deflector positioned relative to the separator pan floor to direct the rearward air stream above the separator pan floor and thereby permit forward grain movement along the separator pan, the separator pan floor presenting a forward leading edge, with the forward leading edge being positioned rearwardly of the concave,
said separator pan floor spanning the concave along a lateral direction of the crop harvester.

* * * * *